(12) United States Patent
Chintalapally et al.

(10) Patent No.: US 10,445,142 B2
(45) Date of Patent: Oct. 15, 2019

(54) EDGE COMPUTING PLATFORM

(71) Applicant: Accenture Global Solutions Limited, Dublin (IE)

(72) Inventors: Anuraag Chintalapally, Boulder, CO (US); Narendra Anand, Sunnyvale, CA (US); Srinivas Yelisetty, Fremont, CA (US); Michael Giba, Dublin (IE); Teresa Tung, San Jose, CA (US); Carl Dukatz, San Jose, CA (US); Colin Puri, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/040,056

(22) Filed: Jul. 19, 2018

(65) Prior Publication Data

US 2019/0050264 A1  Feb. 14, 2019

Related U.S. Application Data

(63) Continuation of application No. 15/836,557, filed on Dec. 8, 2017.

(Continued)

(51) Int. Cl.
*G06F 9/46* (2006.01)
*G06F 9/50* (2006.01)
(Continued)

(52) U.S. Cl.
CPC .......... *G06F 9/5044* (2013.01); *G06F 9/4881* (2013.01); *H04L 63/08* (2013.01); *G06F 2209/5021* (2013.01); *G06F 2209/549* (2013.01)

(58) Field of Classification Search
CPC ....... G06F 9/5044; G06F 9/4881; H04L 63/08
See application file for complete search history.

(56) References Cited

U.S. PATENT DOCUMENTS 7,900,206 B1 * 3/2011 Joshi ...................... G06F 9/505
  709/223
9,495,211 B1 11/2016 Helstroom et al.
(Continued)

FOREIGN PATENT DOCUMENTS

CA       2902128      3/2016
WO    WO 2014/035936  3/2014

OTHER PUBLICATIONS

Examination Report No. 2 in Australia application No. 2017276254, dated Nov. 16, 2018, pp. 1-4.

(Continued)

*Primary Examiner* — James J Lee
(74) *Attorney, Agent, or Firm* — Brinks Gilson & Lione

(57) ABSTRACT

A method for provisioning a computer includes providing a graph that defines relationships between one or more hardware components of a plurality of computers and component characteristics of the one or more hardware components, and relationships between one or more applications and requirements of the one or more applications. The method further includes receiving a selection of an application and determining, via the graph, whether at least one computer with hardware components capable of meeting the requirements of the application exists. If a computer exits, the method also includes communicating the application to the computer; triggering the computer to execute the application; and communicating, from the computer, data processed by the application to an external system.

18 Claims, 13 Drawing Sheets

Related U.S. Application Data

(60) Provisional application No. 62/435,492, filed on Dec. 16, 2016, provisional application No. 62/473,079, filed on Mar. 17, 2017, provisional application No. 62/543,774, filed on Aug. 10, 2017.

(51) Int. Cl.
*H04L 29/06* (2006.01)
*G06F 9/48* (2006.01)

(56) References Cited

U.S. PATENT DOCUMENTS

| | | | | |
|---|---|---|---|---|
| 2010/0064043 | A1* | 3/2010 | Iino | G06F 9/468 709/226 |
| 2015/0334184 | A1 | 11/2015 | Liverance | |
| 2016/0094477 | A1 | 3/2016 | Bai et al. | |
| 2016/0292304 | A1* | 10/2016 | Kartha | G06F 16/9024 |
| 2017/0041271 | A1* | 2/2017 | Tal | H04L 43/045 |
| 2018/0124158 | A1* | 5/2018 | Amento | H04L 67/10 |
| 2019/0005071 | A1* | 1/2019 | Kvalnes | G06F 17/2705 |

OTHER PUBLICATIONS

Australia Patent Office, Examination Report No. 1 in Australian Application No. 2017276254, dated May 17, 2018, pp. 1-6.
European Patent Office, Extended European Search Report, in European Application No. 17207854.5, dated Apr. 9, 2018, pp. 1-8.
Hunke et al., "Winning in IoT: Its All About the Business Processes," White Paper, BCG Perspectives, by the Boston Consulting Group, Jan. 2017, pp. 1-7.
GE Predix Platform |GE Digital Predix, obtained from the Internet on Nov. 28, 2018, at URL: <https://www.ge.com/digital/iiot-platform>, pp. 1-8.
Enable Digital Transformation With Industrial Internet of Things Solutions From PTC |Accelerate Your Digital Transformation With the Industrial IoT, obtained from the Internet on Nov. 28, 2018 from URL: <https://www.ptc.com/en/products/iot>, pp. 1-19.
Patel et al., "Mobile-Edge Computing—Introductory Technical White Paper," White Paper, Mobile-Edge Computing (MEC) Industry Initiative, Issue 1, Sep. 18, 2014, pp. 1-36.
Felter et al., IBM Research Report "An Updated Performance Comparison of Virtual Machines and Linux Containers," in IEEE Performance Analysis of Systems and Software (ISPASS), dated Jul. 21, 2014, pp. 1-15.
Examination report No. 3 issued on Australian patent application No. 2017276254 dated May 1, 2019, 2 pages.
European Office Action, dated Jul. 11, 2019, pp. 1-5, issued in European Patent Application No. 17207854.5, European Patent Office, Rijswijk, The Netherlands.

* cited by examiner

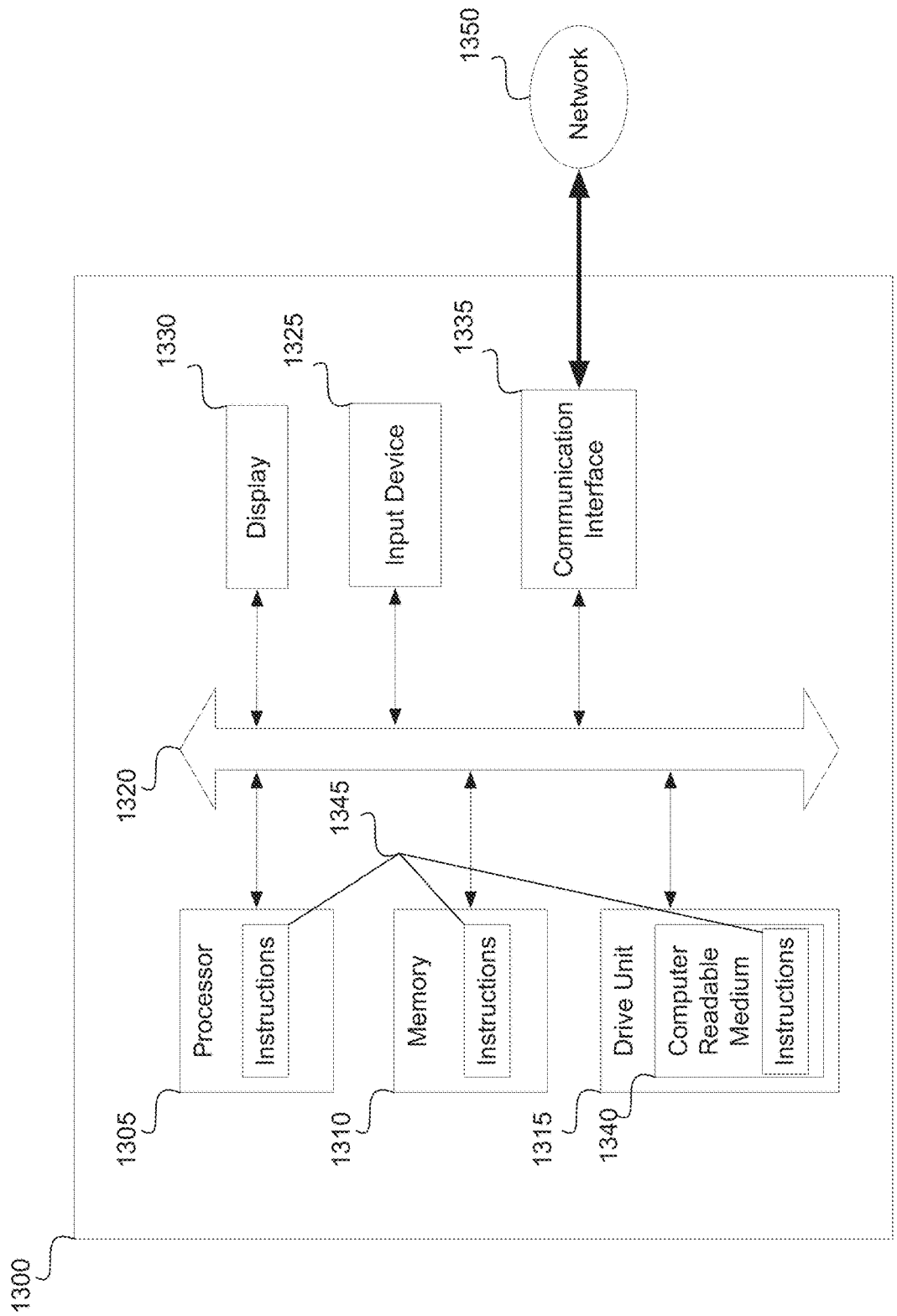

10,445,142 B2

EDGE COMPUTING PLATFORM

RELATED APPLICATIONS

This application is a continuation of U.S. patent application Ser. No. 15/836,557, filed Dec. 8, 2017, which claims the benefit of priority to U.S. Provisional Application Nos. 62/435,492, filed Dec. 16, 2016; 62/473,079, filed Mar. 17, 2017; 62/543,774, filed Aug. 10, 2017. All the content in these applications is hereby incorporated by reference.

BACKGROUND

Field

This disclosure relates to a complex architecture that implements edge device discovery and device capability mapping, and that defines and delivers application requirements templates, as well as controls the technical communication parameters of edge devices.

Description of Related Art

The processing power, network bandwidth, available storage space, and other resources available to computing systems have increased exponentially in recent decades. Advances in network connectivity and device capabilities have led to the routine connection of immense numbers of devices to individual networks, e.g., an enterprise network with hundreds of connected workstation, laptop, and smartphone devices. It is a significant technical challenge to accurately determine what types of devices are connected and the capabilities of the devices, as well as to determine and assign execution tasks to the devices which might otherwise remain underutilized.

BRIEF SUMMARY

In one aspect, a method for provisioning a computer includes providing a graph that defines relationships between one or more hardware components of a plurality of computers and component characteristics of the one or more hardware components, and relationships between one or more applications and requirements of the one or more applications. The method further includes receiving a selection of an application and determining, via the graph, whether at least one computer with hardware components capable of meeting the requirements of the application exists. If a computer exists, the method also includes communicating the application to the computer; triggering the computer to execute the application; and communicating, from the computer, data processed by the application to an external system.

In a second aspect a computing environment includes an edge device; and an enterprise data center in communication with the edge device. The enterprise data center includes a processor, non-transitory computer readable media that stores instruction code, and data storage. The data storage stores a graph database that defines relationships between one or more hardware components of a plurality of computers and component characteristics of the one or more hardware components, and relationships between one or more applications and requirements of the one or more applications. The instruction code is executable by the processor to cause the processor to receive a selection of an application; determine, via the graph, at least one edge computer with hardware components capable of meeting the requirements of the application; communicating the application to the edge computer; trigger the edge computer to execute the application; and receive from the edge computer data processed by the application to an external system.

In a third aspect, a non-transitory computer readable medium that stores instruction code for provisioning a computer is provided. The instruction code is executable by a machine for causing the machine to perform acts comprising providing a graph that defines relationships between one or more hardware components of a plurality of computers and component characteristics of the one or more hardware components, and relationships between one or more applications and requirements of the one or more applications. The instruction code also causes machine to receive a selection of an application; determine, via the graph, at least one computer with hardware components capable of meeting the requirements of the application; communicate the application to the computer; triggering the computer to execute the application; and communicate data processed by the application to an external system.

BRIEF DESCRIPTION OF THE DRAWINGS

FIG. 13 illustrates an exemplary computer system that may form part of or implement the systems described in the figures or in the following paragraphs.

DETAILED DESCRIPTION

The description below and the corresponding figures provide an edge computing platform (herein after "platform") that implements technical solutions to difficult technical problems, including accurately determining the types of edge devices that are connected and the capabilities of the edge devices, as well as determining and assigning execution tasks to the edge devices.

One technical benefit of the platform is that edge devices which might otherwise remain underutilized can be consistently assigned workloads specifically appropriate for any particular type of edge device.

The platform automatically discovers edge devices and generates a graph of the edge devices. In addition, the platform defines centralized application templates, which the platform may then deploy to edge devices in connection with assigning applications to the edge devices. The platform also coordinates metadata tagging of data produced by the applications to facilitate intelligent control over the technical communication parameters (e.g., compression, data transmit priority, data resolution, encryption, or other parameters) of the edge devices.

Figure 1:
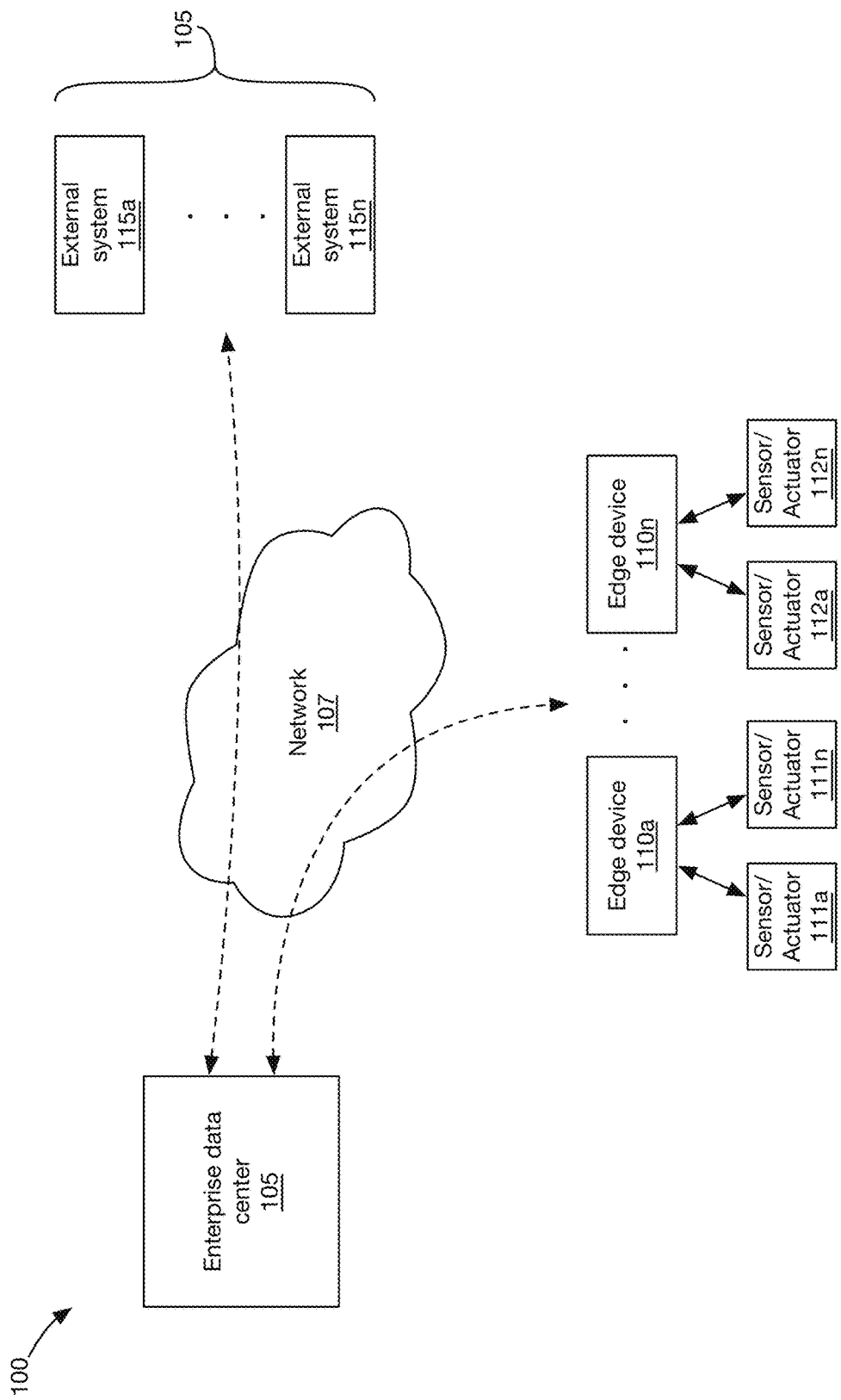
FIG. 1 illustrates an exemplary edge computing environment.

FIG. 1 illustrates an exemplary edge computing environment 100. Entities of the edge computing environment 100 include an enterprise data center (EDC) 105, one or more edge devices 110a-n, and one or more external systems 115a-n. The EDC 105, one or more edge devices 110a-n, and one or more external systems 115a-n may communicate with one another via a network 107, such as the Internet. As will be described in more detail below, during operation, the edge devices 110a-n may receive information from one or more sensors 111a-n, 112a-n and/or communicate information to one or more sensors, actuators, etc. The edge devices 110a-n may process the information and communicate the processed information to one or more of the external systems 115a-n via a direct path, via an indirect path through the EDC 105, or via a different path.

Figure 2:
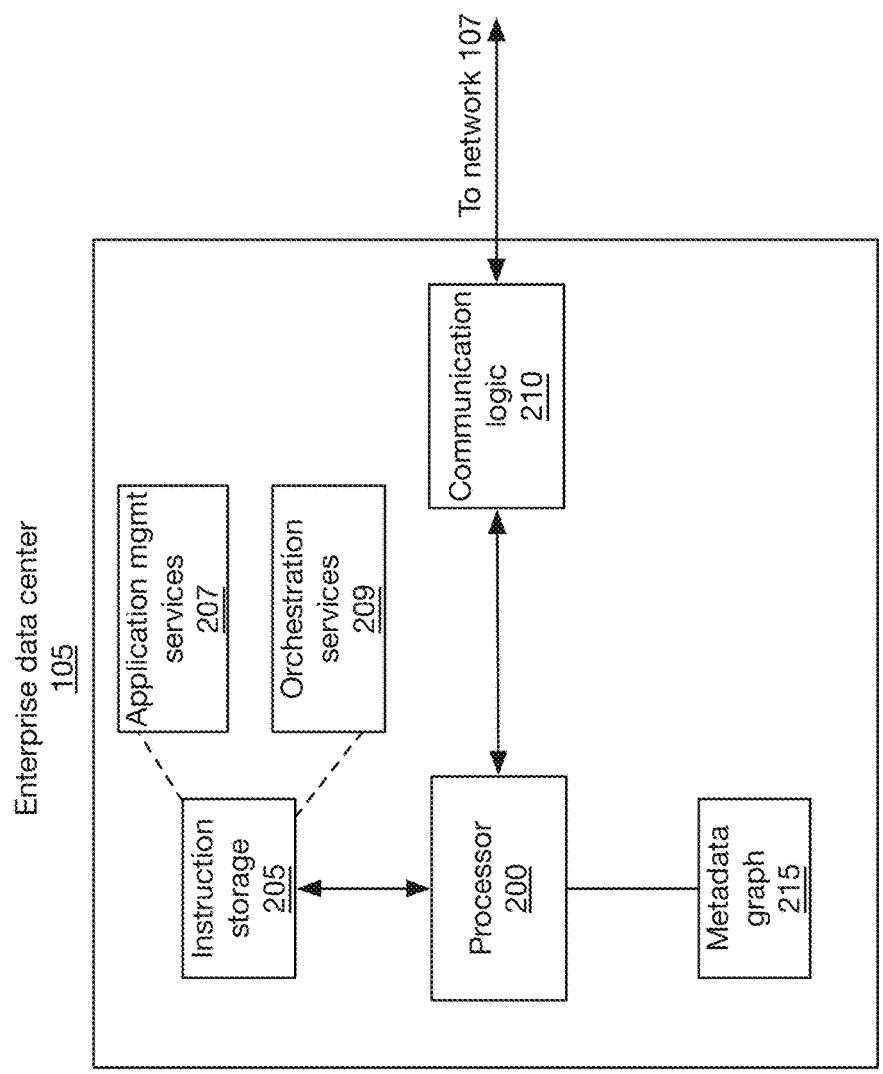
FIG. 2 illustrates a hardware architectural view of an enterprise data center (EDC) of the environment.

FIG. 2 illustrates a hardware architectural view of the EDC 105. Referring to FIG. 2, the EDC 105 may include various components in communication with a processor 200 that include instruction storage 205, communication logic 210, a device/model graph database 215 (herein after metadata graph), and or other components.

The EDC 105 may be configured to perform the functionality of a computer system. In this regard, the processor 200 may correspond to an Intel®, AMD®, or PowerPC® processor or a different processor, and the EDC 105 may implement an operating system, such as a Microsoft Windows®, Linux, Unix® or other operating system.

The instruction storage 205 holds instruction code that controls the operation of the EDC 105. The instruction code may include operating system instruction code along with specific instruction code that controls the processor 200 of the EDC 105 to perform specific edge computing management tasks. For example, the specific instruction code may control the processor 200 to perform various application management services 207, orchestration services 209, and/or other services. Details of these services are described in more detail below.

The communication logic 210 may correspond to network hardware that facilitates communicating information to and from the enterprise data center. For example, the communication hardware may communicate an application to a specific edge device 110 for execution on the edge device 110. Processed data generated by an edge device 110 may be received via the communication hardware and forwarded to an external system 115. In addition, the external system 115 may communicate parameters and other information via the communication hardware to the edge device 110.

The metadata graph 215 defines a graph structure of nodes, edges and properties that represent aspects of various edge devices 110a-n of the edge computing environment 100 and applications to be executed on one or more of the edge devices 110a-n. For example, edge device information may include edge device type, edge device hardware and software capabilities, sensor types connected to the edge device 110 and data provided by the sensors (111 and 112), and actuators and data provided to the actuators.

Application metadata may include hardware and software requirements of the application that facilitate proper execution of the application and data requirements that specify the type, speed, format, etc., of data to be ingested by the application. Other edge device metadata and application metadata may be defined in the metadata graph 215.

Figure 3:
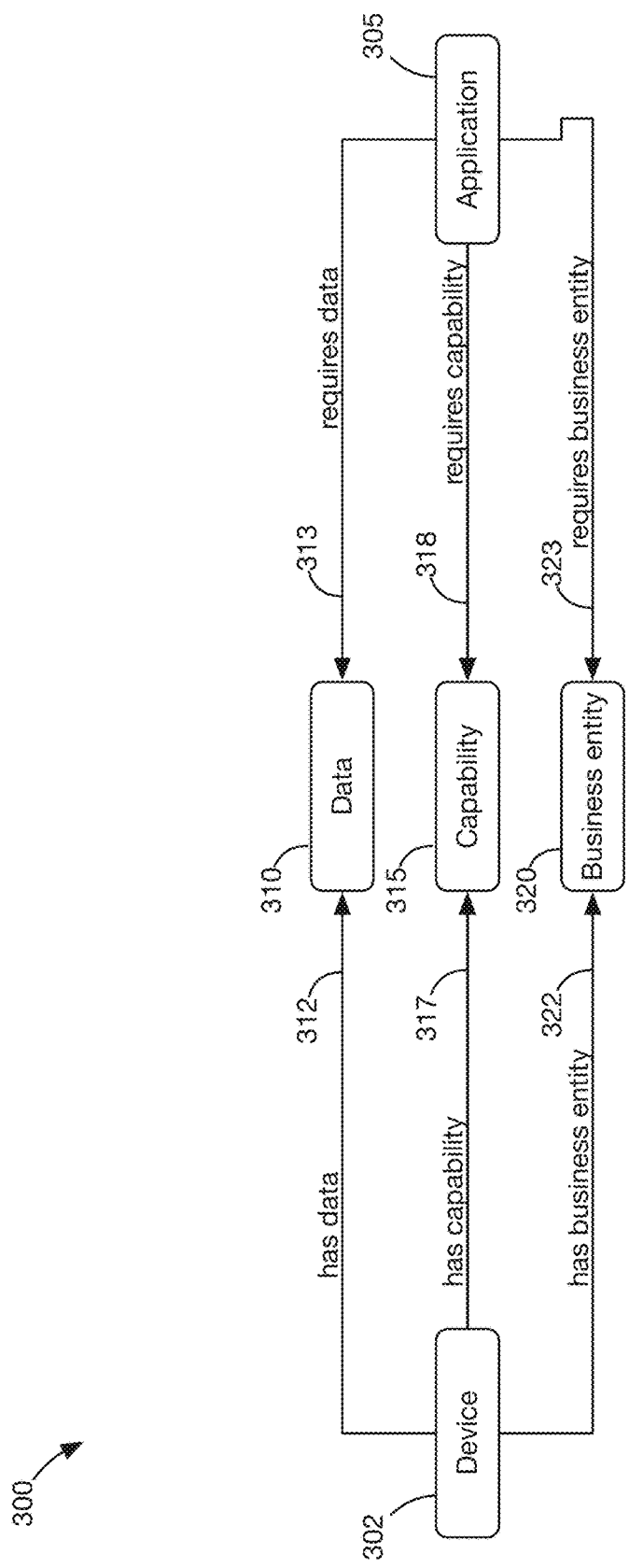
FIG. 3 is a graph that illustrates core concepts of a metadata graph of the EDC.

FIG. 3 is a graph 300 that illustrates core concepts of the metadata graph 215. The graph 300 includes the core nodes device 302, application 305, data 310, capability 315, and business entity 320. According to the graph 300, devices 302 may have data 312, capabilities 317, and an associated business entity 322. Applications 305 may require data 313, capabilities 318, and an associated business entity 323. In other words, a device based on the graph 300 may be able to generate data (e.g., video, sensor data), have certain capabilities (e.g., a graphics processing unit (GPU), WiFi), and be associated with a particular business entity. An application based on the graph can require certain types of data (e.g., sensor data) and hardware capabilities (e.g., GPU) to perform certain analytics.

Figure 4:
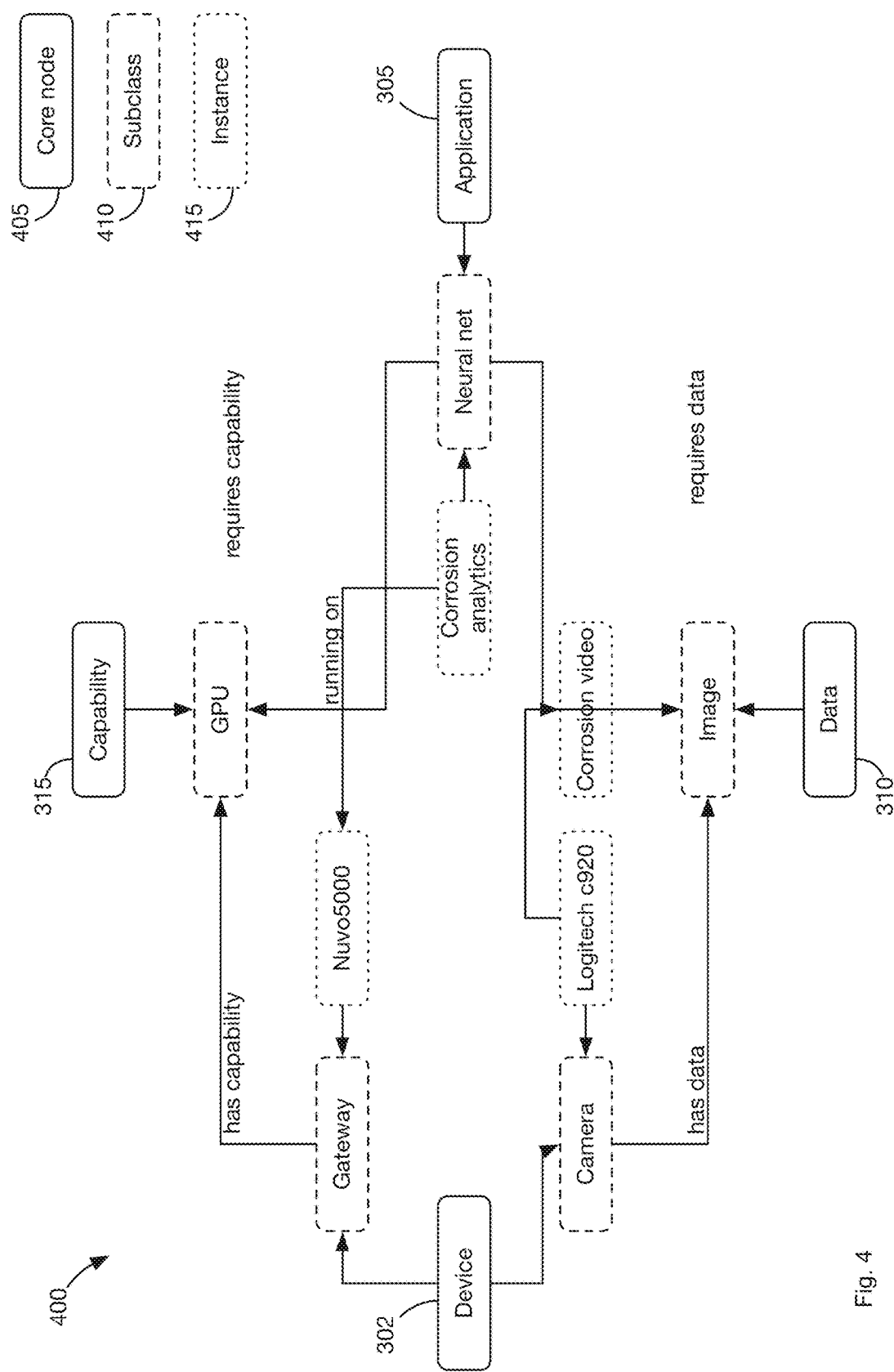
FIG. 4 illustrates an exemplary graph that conforms to the concepts of the graph of FIG. 3 to specify one or more devices and applications.

FIG. 4 illustrates an exemplary graph 400 that conforms to the concepts of the graph 300 of FIG. 3 to specify one or more devices and applications. The graph 400 illustrates the relationships between core nodes 405, subclass nodes 410, and instance nodes 415. The core nodes 405 include device, application, data, and capability nodes that correspond to the same nodes in the graph 300 of FIG. 3.

According to the exemplary graph 400 illustrated in FIG. 4, the device core node 302 includes subclasses gateway and camera. Nuvo5000 is specified to be an instance of a gateway, which is a subclass of the device core node 302. Logitech c920 is specified to be an instance of a camera, which is a subclass of the device core node 302. This means that Nuvo5000 is a specific gateway device and Logitech c920 is a specific camera device. In addition, according to the graph 400, the gateway subclass has GPU capabilities. Therefore, the Nuvo5000, which is an instance of the gateway, has GPU capabilities. Similarly, the camera has/generates image data. Therefore, the Logitechc920, which is an instance of the camera, also generates image data.

Further, in the exemplary graph 400 illustrated in FIG. 4, the application core node 305 includes a neural net subclass. Corrosion analytics is specified to be an instance of neural net. This means that corrosion analytics is a specific type of neural net analytic application. Further, according to the graph 400, corrosion analytics is specified to be running on the Nuvo5000. That is, the Nuvo5000 equipment is executing the corrosion analytics application. If the corrosion analytics node was not running, the "running on" relationship would not exist. Thus, analysis of the graph facilitates determining whether an application is currently running on a given edge device 110.

Figure 5:
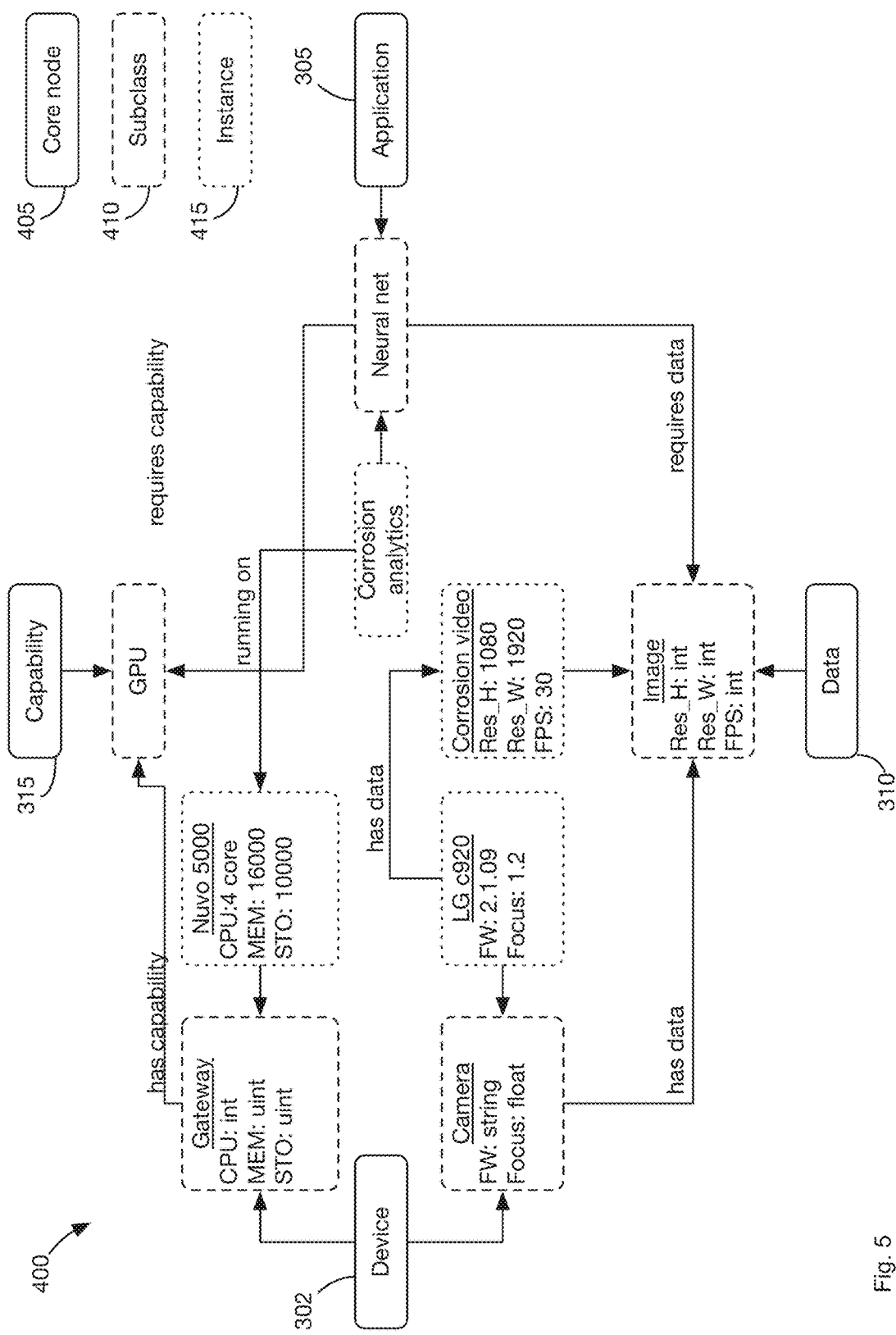
FIG. 5 illustrates additional details that may be specified in the graph of FIG. 4.

FIG. 5 illustrates additional details that may be specified in the graph 400 of FIG. 4. In particular, nodes may specify properties. For example, instances of the gateway subclass may be required to specify a number of CPUs, an amount of RAM, and an amount of hard drive memory. Therefore, as illustrated, the Nuvo 5000 gateway instance specifies, for example, the number of CPUs to be 4, the amount of RAM to be 16K, and the amount of hard drive memory to be 10000.

Instances of the camera subclass may be required to provide a string representation of a firmware version and a floating point value for an aperture setting. Therefore, as illustrated, the LG c920 camera instance specifies, for example, a firmware version of 2.1.09 and an aperture setting of 1.2. The LG c920 is further specified to generate corrosion video data, which is an instance of image, which is in turn a subclass of data 310. Instances of the image subclass may be required to provide horizontal and vertical resolution values and a frame rate. Therefore, as illustrated, the corrosion video instance specifies, for example, a horizontal resolution of 1080, a vertical resolution of 1920, and a frame rate of 30 frames per second.

In an initial state, the metadata graph 215 may correspond to the graph 300 of FIG. 3. Insertion of the subclasses, properties, relationship, etc., as illustrated in FIGS. 4 and 5, may be subsequently performed by an edge device expert in the case of nodes related to an edge device, and by a data scientist/application expert in the case of nodes related to applications. In this regard, the EDC 105 may provide an API (e.g., webpage, web services interface) to facilitate making changes to the metadata graph 215 from a remote computer.

Figure 6:
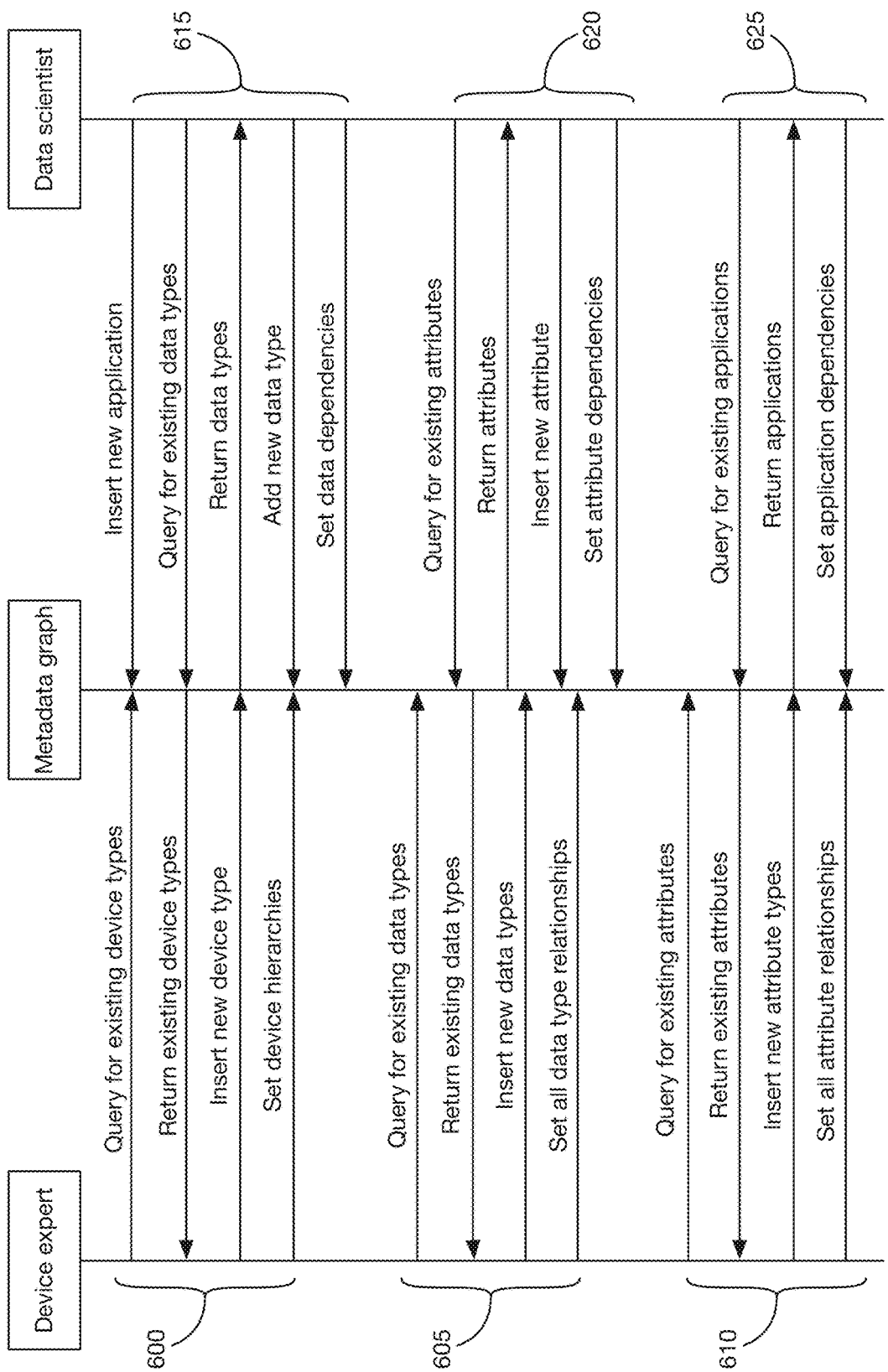
FIG. 6 illustrates various steps that may be taken by a device expert to insert a new device type into the metadata graph, and steps taken by the data scientist to insert a new application type into the metadata graph.

FIG. 6 illustrates various steps that may be taken by the device expert to insert a new device type into the metadata graph 215, and steps taken by the data scientist to insert a new application type into the metadata graph 215. For example, in a first group of operations 600, the device expert may submit a query to the metadata graph 215 via the API to return existing devices type. If a desired device type is not present, the device expert may issue a command via the API to insert a new device type into the metadata graph 215 and to set the device hierarchy to show how the device type relates to existing device types.

In a next group of operations 605, the device expert may submit a query to the metadata graph 215 via the API to return existing data types. If a desired data type is not present, the device expert may issue a command via the API to insert a new data type into the metadata graph 215 and other commands to set the relationships of the data type to show how the data type relates to existing data types.

In a next group of operations 610, the device expert may submit a query to the metadata graph 215 via the API to return existing attributes. If a desired attribute is not present, the device expert may issue a command via the API to insert one or more new attributes into the metadata graph 215 and other commands to set the relationships of the attributes to show how the attribute relates to existing attributes.

With regard to the application, in a first group of operations 615, the data scientist may issue a command via the API to insert a new application. The data scientist may then submit a query via the API to the metadata graph 215 to return existing data types. If a desired data type is not present, the device expert may issue a command via the API to add a new data type into the metadata graph 215 and other commands to set dependencies of the data type to show how the data type depends from existing data types.

In a next group of operations 620, the data scientist may generate a query to the metadata graph 215 to return existing attributes. If desired attributes are not present, the data scientist may issue a command via the API to insert one or more new attributes into the metadata graph 215 and other commands to set the dependencies of the attributes to show how the attributes depend from existing attributes.

In a next group of operations 625, the data scientist may generate a query to the metadata graph 215 to return existing applications. The data scientist may then issue a command via the API to set the dependencies of the application inserted in the first group of operations 615 to existing applications.

Figure 7:
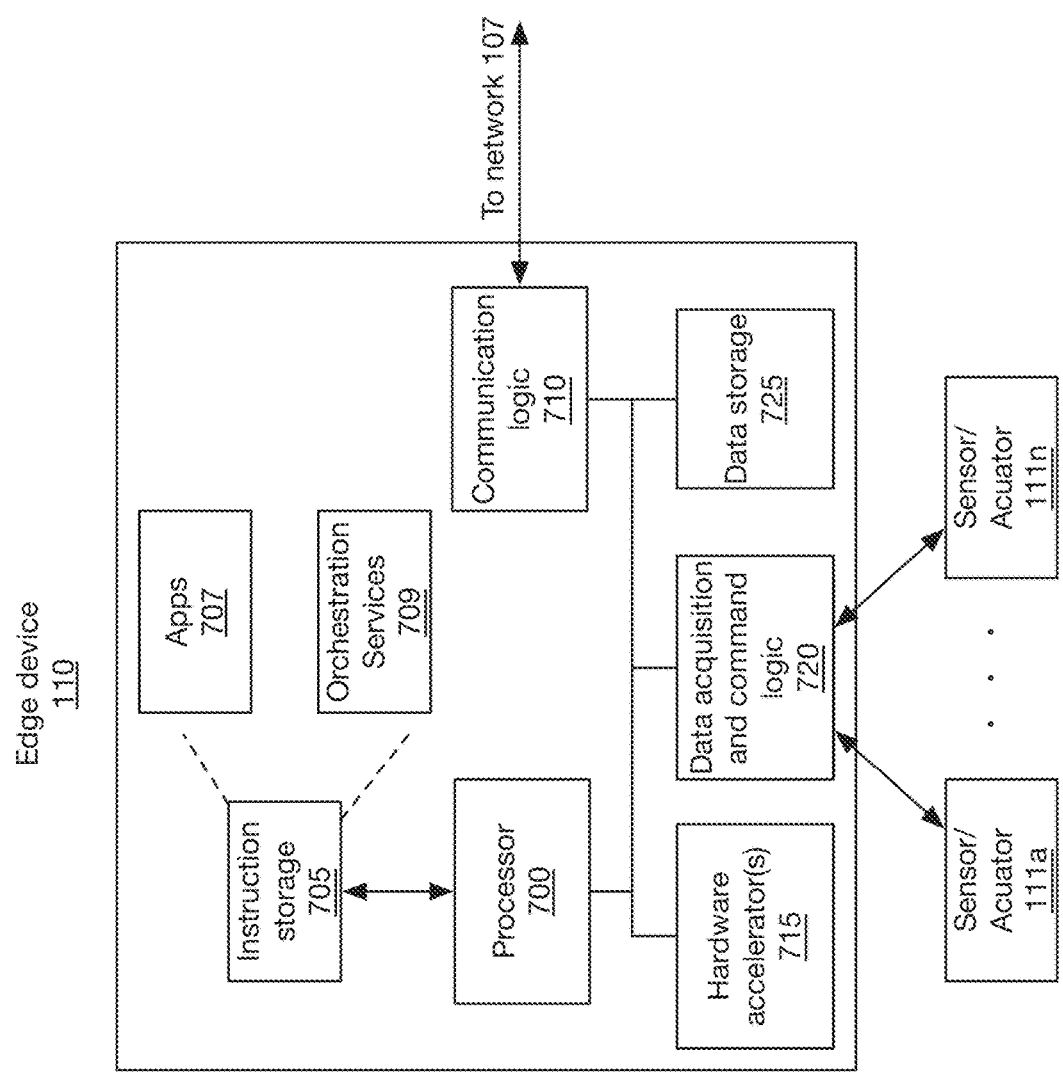
FIG. 7 illustrates a hardware architectural view of an edge device of the environment.

FIG. 7 illustrates a hardware architectural view of an edge device 110. Referring to FIG. 7, each edge device 110*a-n* may include various components in communication with a processor 700 that include instruction storage 705, communication logic 710, one or more hardware accelerators 715, bidirectional data acquisition and command logic 720, data storage 725, and or other components.

Each edge device 110 may be configured to perform the functionality of a computer system. In this regard, the processor 700 may correspond to an Intel®, AMD®, or PowerPC® processor or a different processor, and each edge device 110 may implement an operating system, such as a Microsoft Windows®, Linux, Unix® or other operating system.

The instruction storage 705 holds instruction code that controls the operation of the edge device 110. The instruction code may include operating system instruction code along with specific instruction code that controls the processor 700 of the edge device 110 to perform specific edge computing tasks. For example, the specific instruction code may control the processor 700 to perform various analytical operations on sensor data according to one or more applications 707 communicated to the edge device 110, perform various orchestration services 709 to support communication of processed sensor data to one or more external systems 115*a-n*, and/or other services. Details of these services are described in more detail below.

The communication logic 710 may correspond to network hardware that facilitates communicating information to and from the edge device 110. For example, the communication hardware may receive an application from the EDC 105. Processed data generated by the application may be communicated via the communication logic 710 to the EDC 105 and/or to one or more external systems 115*a-n*.

The hardware accelerator(s) 715 may correspond to a processor or processors specifically configured to excel at performing one or more specific functions. For example, the hardware accelerator 715 may correspond to a graphics processing unit (GPU), a cryptographic processor, an ASIC configured to perform a specific calculation, etc.

The bidirectional data acquisition and command logic 720 is configured to communicate with a variety of sensors (111 and 112), actuators, and/or controllers. For example, the bidirectional data acquisition and command logic 720 may implement interfaces such as WiFi, Bluetooth, serial, parallel, USB, FireWire, Thunderbolt, or different interfaces capable of communicating with sensors (111 and 112). The sensors (111 and 112) may correspond to pressure and temperature sensors, flow meters, accelerometers, image sensors, magnetic sensors, etc.

The bidirectional data acquisition and command logic 720 may receive data from one or more sensors 111*a-n* and store the data to a data storage device 725. An application 707 operating on the edge device 110 may process data stored in the data storage device 725 and store the processed information back to the data storage device 725 and/or communicate the processed information to an external system 115 via the communication logic 710.

Figure 8:
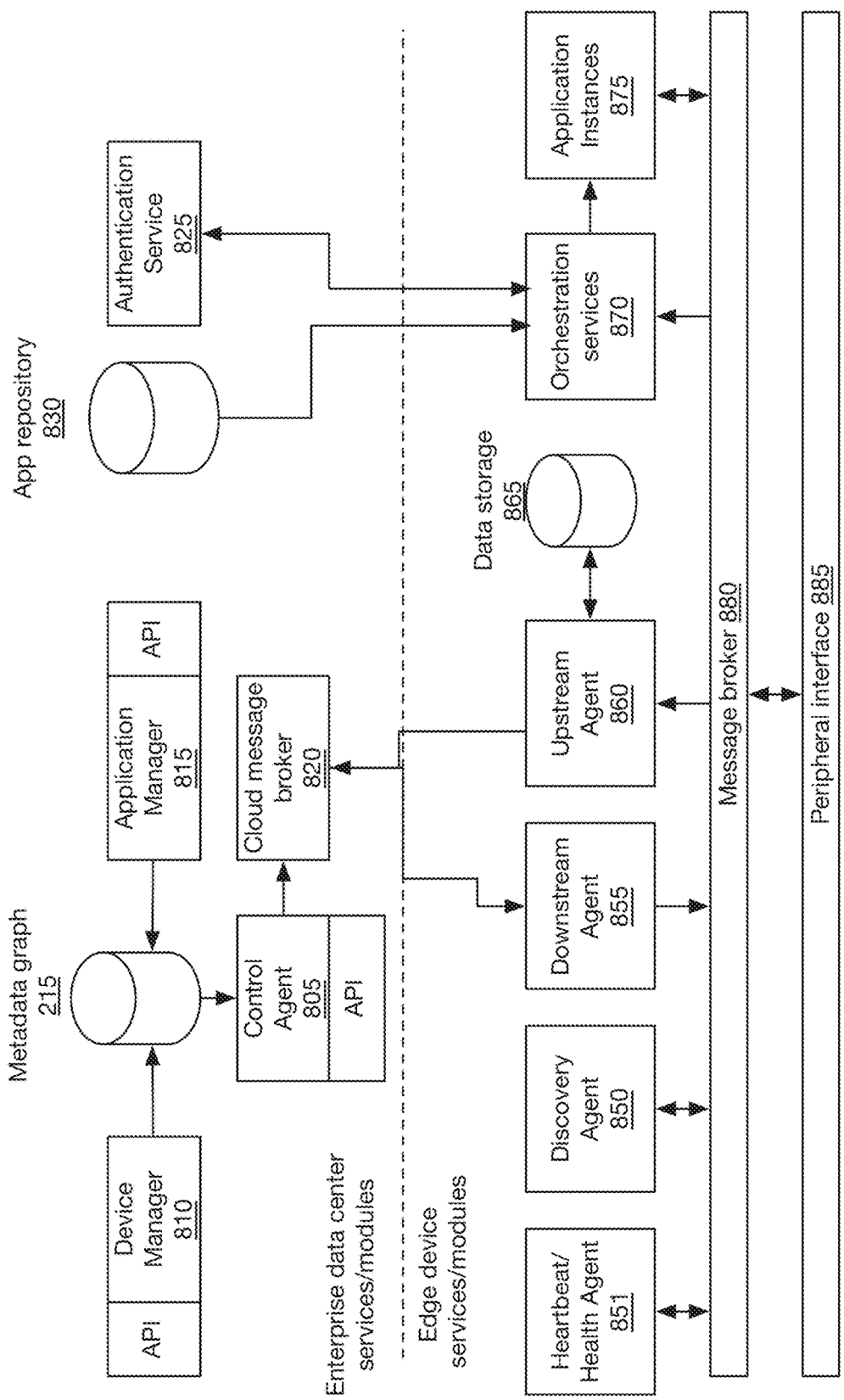
FIG. 8 illustrates various logical entities implemented by the EDC and edge device in providing edge computing services.

FIG. 8 illustrates various logical entities implemented by the EDC 105 and edge device 110 in providing edge computing services.

Logical entities of the EDC 105 include a control agent 805, device manager 810, application manager 815, cloud message broker 820, and authentication service 825.

The cloud message broker 820 is configured to control the flow of information between the EDC 105 and the edge device 110. In one implementation, the cloud message broker 820 may correspond to a distributed streaming platform such as Apache Kafka™. The message broker may associate different streams of data flowing between the EDC 105 and the edge device 110 with a unique topic name that may include a unique edge device identifier such as UUID.

The application manager 815 receives information associated with an application and extracts metadata from the information. The metadata characterizes the application. For example, the application manager 815 may capture all dependencies for the application to run (e.g. ingested data type, hardware accelerator capability, etc.). The application manager 815 may then insert a new node into the metadata graph 215 as a subclass of another node if a suitable parent node exists, or may depend the new node directly from the application core node. Any required data may be specified along with parameters specifying the acceptable range for the data. Edges/relationships may be created between the newly created application node and the data subclasses with the ranges as edge descriptors. An edge may be generated pointing to any capability requirements. Parameters, if specified, may be captured in the form of edge descriptors.

The device manager 810 is configured to process device information communicated from an edge device 110 that specifies the characteristics of the edge device 110. For example, the device manager 810 may extract a listing of hardware within the edge device 110 and or connected to the edge device 110 along with details regarding the hardware, such as model numbers, firmware versions, etc., and create a graph to represent the edge device, its components, and characteristics. The device manager 810 may store the graph to the metadata graph 215 or update the graph to reflect changes to an edge device 110.

The control agent 805 is configured to query the metadata graph 215 of EDC 105 to identify edge devices 110a-n that support the requirements of a given application. The control agent 805 is further configured to validate application dependencies against edge device capabilities. In this regard, the control agent 805 may query the device manager 810 to determine aspects such as the Kafka topic or topics associated with data streams produced by a given edge device 110. The control agent 805 may also query the application manager 815 for resource information associated with the application. The control agent 805 is further configured to communicate a control plane message to the edge device 110 to cause a copy of the application to be instantiated on the edge device 110.

The authentication service 825 is configured to control access to the application repository 830, which stores various applications including analytics, utility applications, etc., that may be executed on an edge device 110. The authentication service 825 verifies edge device credentials received from the edge device 110 in order to validate and grant access to the application repository 830.

Logical entities of the edge device 110 include a heartbeat/health agent 851, a discovery agent 850, downstream agent 855, upstream agent 860, orchestration services 870, application instances 875, a message broker 880, and peripheral interface 885. The entities may correspond to applications executed in a containerized environment to facilitate abstraction/independence of the hardware of the edge device 110. For example, everything required to make an application run may be packaged into isolated containers. Containers may bundle libraries and settings required to make the application stored therein work as needed. This, in turn, makes for efficient, lightweight, self-contained systems and guarantees that the application will run the same, regardless of the type of appliance on which it is deployed. In one implementation, the various entities may correspond to Docker® images of a Docker® software container platform.

The message broker 880 corresponds to a messaging platform that facilitates communicating information between the various entities of the edge device 110. In one implementation, the message broker 880 may correspond to a real-time distributed massaging platform such as NSQ, RabbitMQ, and/or a different distributed massaging platform implemented as a Docker® Image and configured to function as a central messaging hub for all system components to facilitate communicating control data, raw sensor data, processed data, and/or other types of data. While the cloud message broker 820 is illustrated as a part of the EDC, in alternative implementations, the cloud message broker 820 may be provided by a third party as messaging system coupled to the network 107.

The heartbeat/health agent 851 may be configured to gather system, platform, and application metrics associated with the edge device 110 for subsequent transmission to the metadata graph 215 of the EDC 105.

The discovery agent 850 may be configured to automatically discover the devices connected to the edge device 110. The discovery agent 850 also discovers characteristics, including the hardware and software resources available within the edge device 110. For example, the discovery agent 850 may interface with operating system resources of the edge device 110 to acquire the information, such as the Device Manager application in Windows®, the System Information application on macOS®, or an application that performs a similar device management function on a different operating system.

The discovery agent 850 may periodically poll the operating system resources to discover changes to the edge device 110. For example, the discovery agent 850 may poll the operating system resources at system startup. The discovery agent 850 may poll the operating system resources during a time interval. The discovery agent 850 may poll the operating system resources in response to receiving an event indicative of a hardware change such as connection of a sensor (111 and 112) to the edge device 110 via a USB port. When the discovery agent 110 discovers new or changed device characteristics, the discovery agent 110 may communicate edge device information indicative of the new or changed device characteristics to the upstream agent 860 via the message broker 880.

The downstream agent 855 receives application control plane messages from the control agent 805 of the EDC 105 or other systems coupled to the network 107. For example, the control plane message may include instructions to instantiate an application, activate the application, disable the application, etc. The downstream agent 855 may communicate the control plane message or portions thereof to a service of the orchestration services entity 870.

The orchestration services 870 may include one or more services that receive the control plane messages from the downstream agent 855 and, in response, attempt to authenticate with the authentication service 825 of the EDC 105. Once authenticated, a service may download an application specified in the control plane message and instantiate the application within the edge device 110.

The upstream agent 860 is configured to send information from the edge device 110 to the EDC 105. The information may include processed data produced by an application, raw data, service data, etc. The upstream agent 860 is further configured to communicate device information generated by the discovery agent 850 and the heartbeat/health agent 851. Information communicated by the upstream agent 860 may be associated with a topic (e.g., Apache Kafka topic) and communicated to the cloud message broker 820 of the EDC 105. Device information may, in turn, be communicated to the device manager 810 of the EDC 105.

Figure 9:
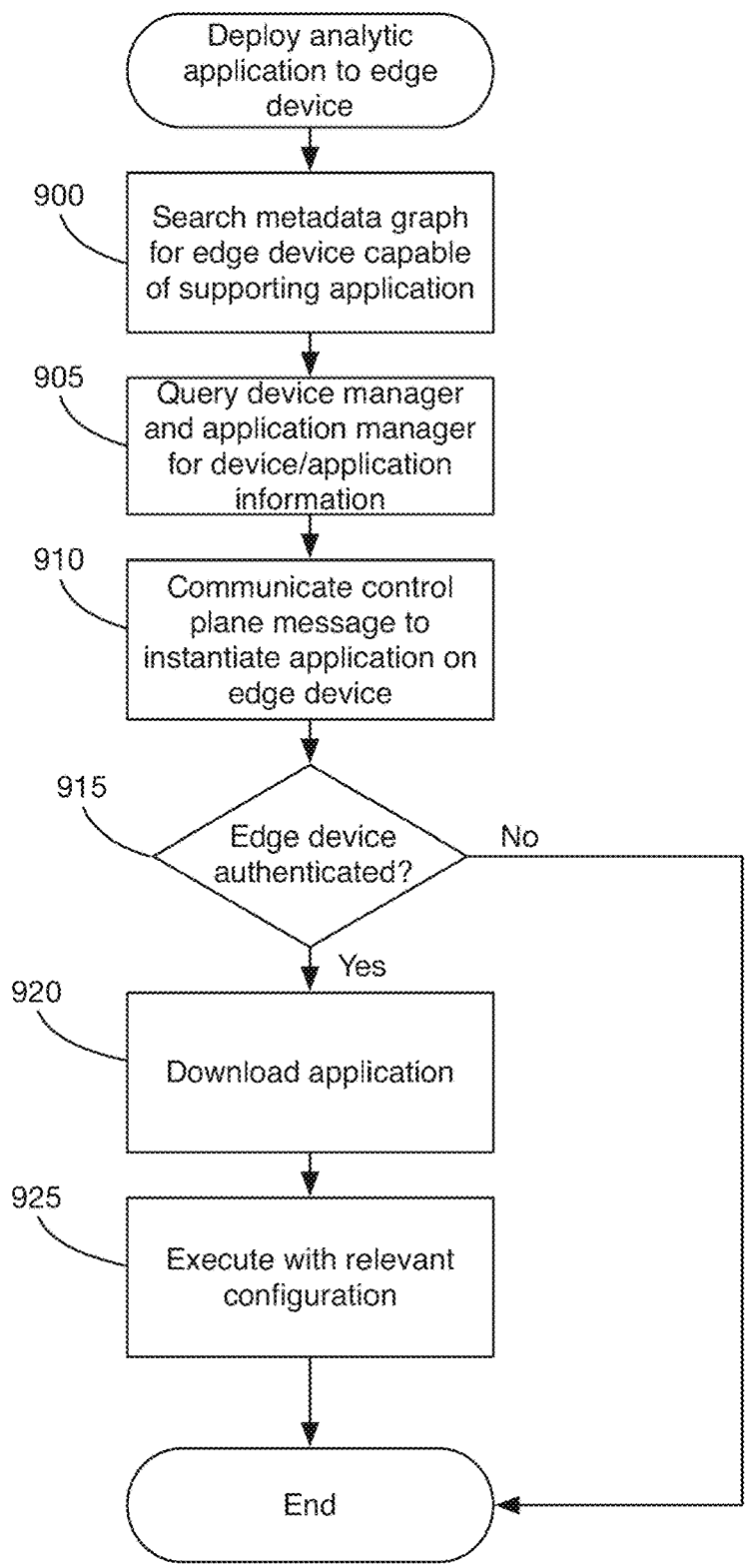
FIG. 9 illustrates exemplary operations performed by the EDC and edge device in deploying an application to the edge device.

Exemplary operations performed by the EDC 105 and edge device 110 in deploying an application to the edge device 110 are illustrated in FIG. 9. In this regard, the operations may be implemented via instruction code stored in non-transitory computer readable media (205 and 705) that resides within these subsystems configured to cause the respective subsystems to perform the operations illustrated in the figures and discussed herein.

Figure 10:
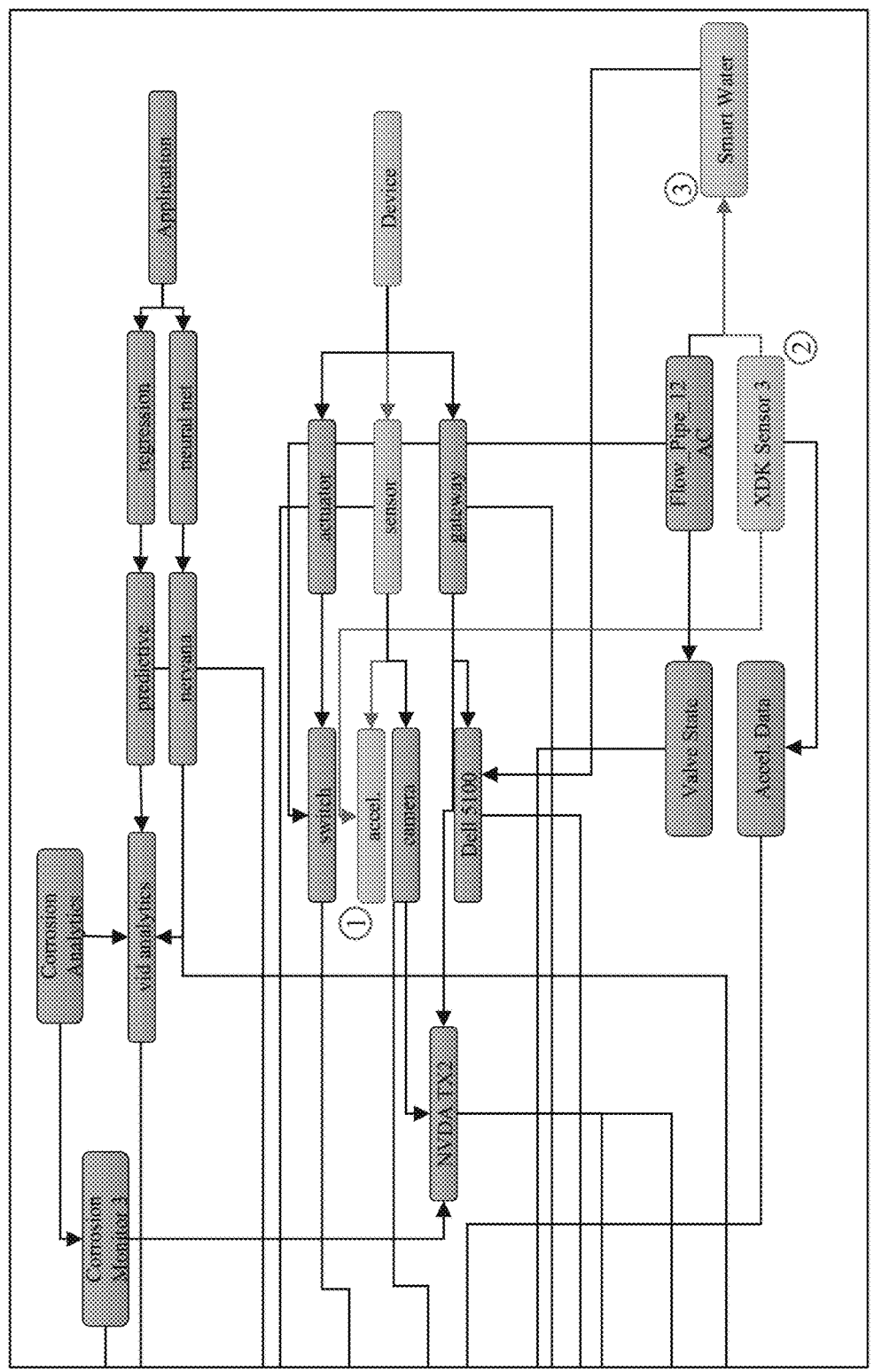
FIG. 10 illustrates selection of a device from the metadata graph.

At block 900, the control agent 805 of the EDC 105 may query the metadata graph 215 of EDC 105 to identify edge devices that support the requirements of a given application. For example, referring to the exemplary graph of FIG. 10, to facilitate locating an edge device 110 (e.g., a gateway) that produces accelerometer data suitable for an analytic application that processes accelerometer data, the control agent 805 may issue a set of queries against the metadata graph 215 to determine whether any gateways produce accelerometer data or are connected to a device, which produces accelerometer data. In this regard, a parameterized query to identify an accelerometer, which is of type sensor, which is of type device may be applied to the metadata graph 215. The query may return the accelerometer labeled 1. Next, a query to determine a gateway device to which the accelerometer is connected may be applied to the metadata graph 215. In this case, according to the metadata graph 215, the accelerometer is a subclass of XDK Sensor, XDK Sensor is indicated as being connected to Smart Water, Smart water is indicated as being an instance of Dell 5100, which is a subclass of Gateway. Therefore, the query may return Smart Water.

At block 905, the control agent 805 may validate application dependencies against edge device capabilities. In this regard, the control agent 805 may query the device manager 810 for a target edge devices Kafka topic or topics and also query the application manager 815 for resource information associated with the application.

At block 910, the control agent 805 may communicate a control plane message to the edge device 110 to instantiate an application on the edge device 110. In this regard, the control plane message may be received by the downstream agent 855 of the edge device 110. The downstream agent 855 may, via the message broker 880, communicate the message to one or more services of the orchestration services 870 of the edge device 110 configured to processes the message. The services may then communicate credentials associated with the edge device 110 to the authentication service 825 of the EDC 105.

At block 915, if the edge device 110 is successfully authenticated, then at block 920, the application specified in the control plane message may be retrieved from the application repository 830 of the EDC 105 and communicated back to the edge device 110.

At block 925, the downloaded application 875 may be launched on the edge device 110 to thereby begin processing data. Processed data produced by the application 875 may be communicated to the upstream agent 860 or other applications, via the message broker 880, and stored to a data storage device 865 of the edge device 110. The upstream agent 860 may then determine a priority associated with the processed data and communicate the processed data to the network 107 according to the priority. The priority may be derived from a configurable priority model that specifies how to handle transmission. For example, low-priority data may be transmitted at a slower rate than high-priority data.

Figure 11:
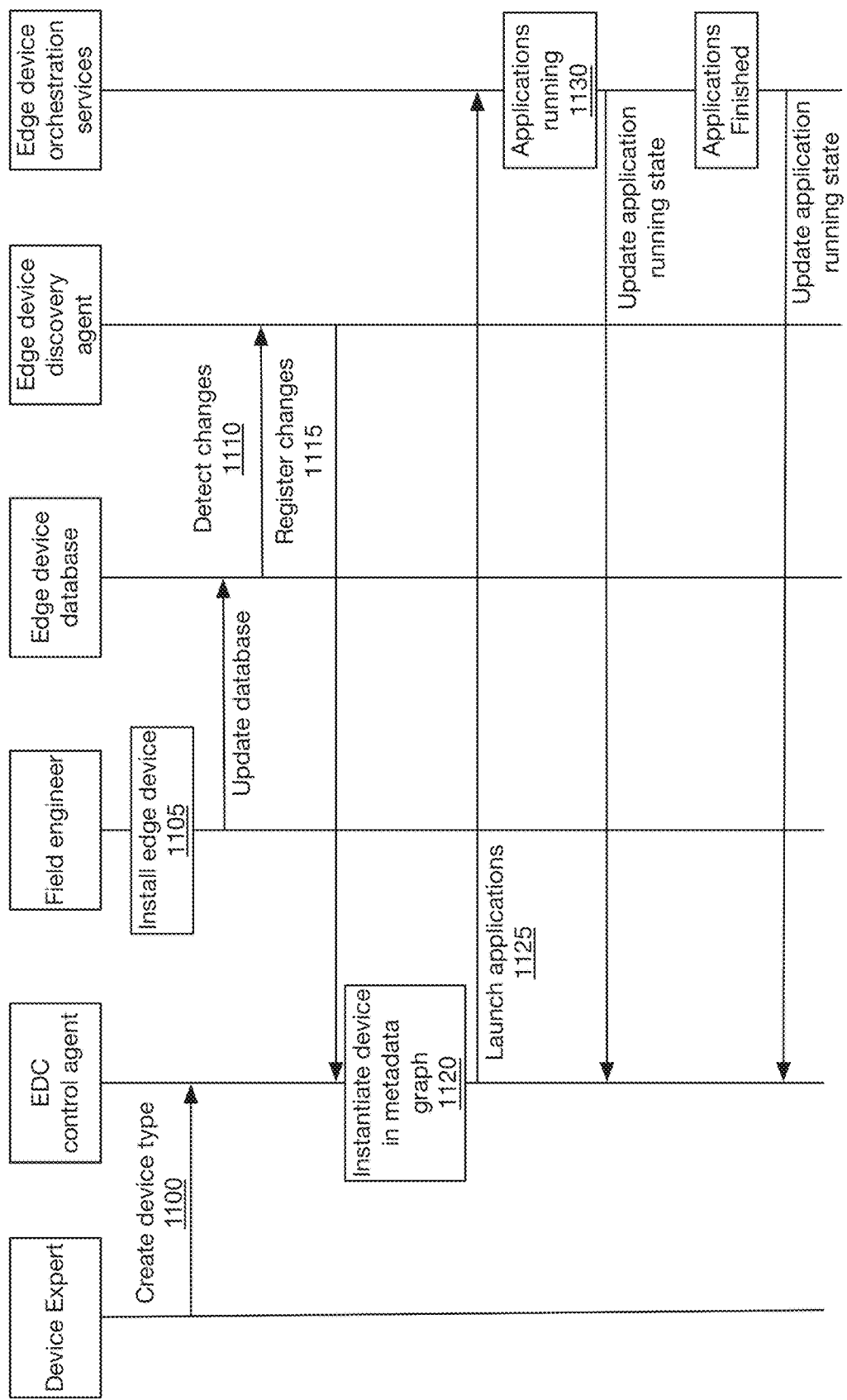
FIG. 11 illustrates exemplary operations for adding a new device instance into the metadata graph.

Exemplary operations for adding a new device instance into the metadata graph 215 are illustrated in FIG. 11. In this regard, one or more of the operations may be implemented via instruction code stored in non-transitory computer readable media (205 and 705) that resides within the EDC 105 and the edge device 110.

At step 1100, a device expert may create a new device type via the API of the EDC 105, as illustrated in FIG. 6.

At step 1105, a field engineer may install edge device equipment at a remote location. For example, the field engineer may install a computer system that conforms to the edge device architecture described in FIG. 7. The field engineer may install additional components such as sensors, controllers, etc., at the remote location and connect them directly or indirectly to the edge device 110. For example, the components may be wired to the edge device 110 directly or through intermediate equipment, such as a PLC, and/or be configured to communicate wirelessly with the edge device 110. Information regarding the edge device 110 and the components in communication with the edge device 110 may be stored in a database of the edge device 110. For example, the operating system of the edge device 110 may maintain a database of edge device attributes.

At step 1110, the discovery agent 850 of the edge device 110 may detect changes made to the edge device database and, at step 1115, may communicate and register the changes to the EDC 105 via the upstream agent 860.

At step 1120, the device manager 810 of the EDC 105 may update the metadata graph 215 to include a new edge device instance associated with the edge device 110 installed by the field engineer that depends from a device subclass or the device core node. The device manager 810 may also set various relationships between the instantiated device and other nodes of the metadata graph 215.

At step 1125, the control agent 805 of the EDC 105 may select an application suitable for execution on the newly installed and instantiated edge device 110. The control agent 805 may then communicate the application to the edge device 110 and a message to launch the application. In addition or alternatively, the control agent 805 may selected a default set of applications and auto-launch the applications on the edge device 110 based on device properties noted in the metadata graph At step 1130, the application may proceed to process data received from the sensors (111 and 112) of the edge device 110 and communicate the processed data to the upstream agent 860 and on to an appropriate external system 115. The running state of the application may be communicated to the EDS 105 to update the running state of the application within the metadata graph 215. When the application is finished, the metadata graph 215 may be updated to reflect that the application is not running.

The discovery agent 850 may continue to operate in the background to detect changes made to the edge device 110. Detected changes may be communicated to metadata graph 215 so that the relationships defined in the metadata graph 215 remain current.

Figure 12:
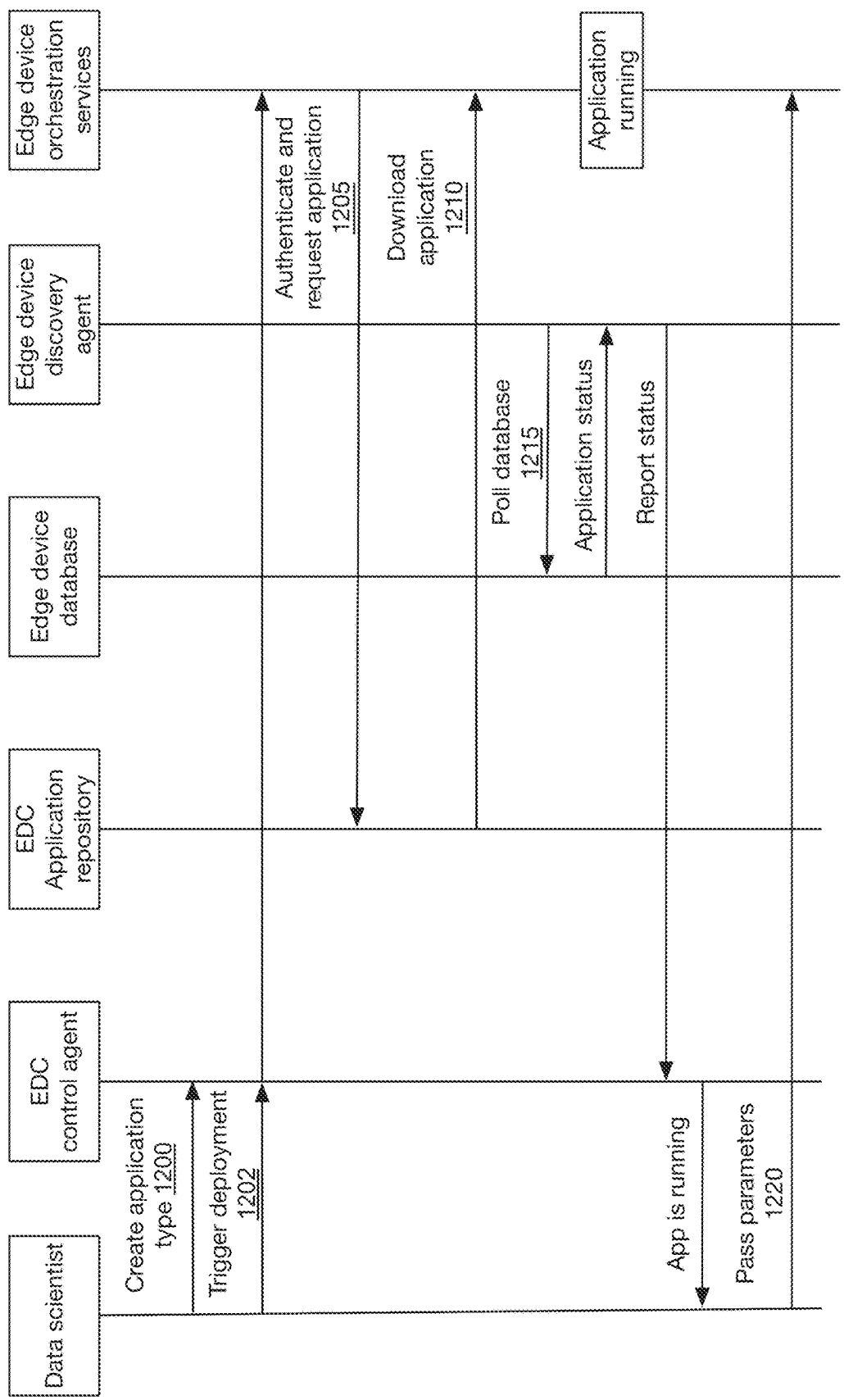
FIG. 12 illustrates exemplary operations for adding a new application instance into the metadata graph.

Exemplary operations for adding a new application instance into the metadata graph 215 are illustrated in FIG. 12. In this regard, one or more of the operations may be implemented via instruction code stored in non-transitory computer readable media (205 and 705) that resides within the EDC 105 and the edge device 110.

At step 1200, an application instance may be automatically generated based on information in the metadata graph when the application is triggered to run on the edge device 110. In some instances, a data scientist may create a new application instance via the API of the EDC 105, as illustrated in FIG. 6.

At step 1202, deployment of the application may be triggered. For example, a message may be communicated via the API to the EDC control agent 805 for deploying the application. The control agent 805 may identify a suitable edge device 110 based on information in the metadata graph 215. The control agent 805 may then communicate a control plane message to an orchestration service 870 of the edge device 110.

After receiving the control plane message, at step 1205, the orchestration service 870 may authenticate with the EDC 105. At step 1210, after successful authentication, the orchestration service 870 may download the application associated with the application instance specified by the data scientist from the application repository of the EDC 105. Afterwards, the application may run on the edge device 110.

At step 1215, the discovery agent 850 of the edge device 110 may poll the edge device database to determine whether the application is operating. The discovery agent 850 may communicate the status of any discovered applications to the EDC control agent 805. The control agent 805 may then update the metadata graph 215 to reflect the operational state of the application. The control agent 805 may then notify the data scientist via the API that the application is running.

At step 1220, parameters required by the application may be automatically communicated via the EDC to the application and/or the data scientist may communicate parameters required by the application to the application.

FIG. 13 illustrates a computer system 1300 that may form part of or implement the systems, environments, devices, etc., described above. The computer system 1300 may include a set of instructions 1345 that the processor 1305 may execute to cause the computer system 1300 to perform any of the operations described above. The computer system 1300 may operate as a stand-alone device or may be connected, e.g., using a network, to other computer systems or peripheral devices.

In a networked deployment, the computer system 1300 may operate in the capacity of a server or as a client computer in a server-client network environment, or as a peer computer system in a peer-to-peer (or distributed) environment. The computer system 1300 may also be implemented as or incorporated into various devices, such as a personal computer or a mobile device, capable of executing instructions 1345 (sequential or otherwise) to cause a device to perform one or more actions. Further, each of the systems described may include a collection of subsystems that individually or jointly execute a set, or multiple sets, of instructions to perform one or more computer operations.

The computer system 1300 may include one or more memory devices 1310 communicatively coupled to a bus 1320 for communicating information. In addition, code operable to cause the computer system to perform operations described above may be stored in the memory 1310. The memory 1310 may be a random-access memory, read-only memory, programmable memory, hard disk drive or any other type of memory or storage device.

The computer system 1300 may include a display 1330, such as a liquid crystal display (LCD), a cathode ray tube (CRT), or any other display suitable for conveying information. The display 1330 may act as an interface for the user to see processing results produced by processor 1305.

Additionally, the computer system 1300 may include an input device 1325, such as a keyboard or mouse, configured to allow a user to interact with components of system 1300.

The computer system 1300 may also include a disk or optical drive unit 1315. The drive unit 1315 may include a computer-readable medium 1340 in which the instructions 1345 may be stored. The instructions 1345 may reside completely, or at least partially, within the memory 1310 and/or within the processor 1305 during execution by the computer system 1300. The memory 1310 and the processor 1305 also may include computer-readable media as discussed above.

The computer system 1300 may include a communication interface 1335 to support communications via a network 1350. The network 1350 may include wired networks, wireless networks, or combinations thereof. The communication interface 1335 network may enable communications via any number of communication standards, such as 802.11, 802.12, 802.20, WiMAX, cellular telephone standards, or other communication standards.

Accordingly, methods and systems described herein may be realized in hardware, software, or a combination of hardware and software. The methods and systems may be realized in a centralized fashion in at least one computer system or in a distributed fashion where different elements are spread across interconnected computer systems. Any kind of computer system or other apparatus adapted for carrying out the methods described herein may be employed.

The methods and systems described herein may also be embedded in a computer program product, which includes all the features enabling the implementation of the operations described herein and which, when loaded in a computer system, is able to carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation and b) reproduction of a first language, code, or notation.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

We claim:

1. A method for provisioning a computer, the method comprising:

retrieving, from a storage device within an enterprise data center, a metadata graph that defines a graph structure of nodes, edges and properties that represent relationships between one or more hardware components of a remote computer system and component characteristics of the one or more hardware components, and relationships between one or more applications and requirements of the one or more applications;

communicating, from the remote computer system and to the enterprise data center, information associated with one or more devices that are added to the remote computer system;

inserting, by the enterprise data center, into the metadata graph one or more nodes to represent the one or more devices;
receiving, by the enterprise data center, information that defines data types and attributes associated with the one or more devices;
associating in the metadata graph the one or more nodes that represent the one or more devices with the corresponding data types and attributes;
receiving a selection of an application;
determining, via the metadata graph, whether the remote computer system includes at least one device capable of meeting the requirements of the application;
if at least one device with one or more hardware components capable of meeting the requirements of the application exists:
communicating the application to the remote computer system by downloading the application to the at least one device;
triggering the remote computer system to execute the application on the at least one device; and
communicating, from the remote computer system, data processed by the application to an external system external from the remote computer system via a network that facilitates communications between the external system and the remote computer system.

2. The method according to claim 1, wherein the one or more devices correspond to one or more sensors or actuators, wherein the application receives raw data from the one or more sensors and generates processed data from the raw data or controls the actuators.

3. The method according to claim 1, wherein the component characteristics of the one or more hardware components include a data type generated by the one or more devices and one or more capabilities of the one or more hardware components, and wherein the requirements of the one or more applications include data and hardware capabilities that facilitate proper execution of the one or more applications.

4. The method according to claim 1, further comprising:
communicating a plurality of applications to the remote computer system for concurrent execution;
determining, by an upstream agent of the remote computer system, a priority associated with processed data generated by each application; and
selecting processed data for communication to the external system based on an associated priority.

5. The method according to claim 4, wherein the remote computer system includes a data storage device to store processed data generated by the plurality of applications until the processed data can be communicated to the external system.

6. The method according to claim 1, wherein communicating the application to the remote computer system further comprises:
communicating a control plane message to the remote computer system that specifies the application;
communicating, by the remote computer system, authentication credentials to an authentication service;
if the authentication service authenticates the remote computer system, communicating, by the remote computer system, a request to download the application from an application repository that stores a plurality of applications;
receiving, by the remote computer system, the requested application from the application repository.

7. A computing environment comprising:
a remote computer system; and
an enterprise data center in communication with the remote computer system, wherein the enterprise data center includes a processor, non-transitory computer readable media that stores instruction code, and data storage, wherein the data storage stores a metadata graph database that defines relationships between one or more hardware components of the remote computer system and component characteristics of the one or more hardware components, and relationships between one or more applications and requirements of the one or more applications;
wherein the instruction code is executable by the processor of the enterprise data center to cause the processor to:
receive, from the remote computer system, information associated with one or more devices that are added to the remote computer system;
insert into the metadata graph one or more nodes to represent the one or more devices;
receive information that defines data types and attributes associated with the one or more devices;
associate in the metadata graph the one or more nodes that represent the one or more devices with the corresponding data types and attributes; receive a selection of an application;
determine, via the metadata graph, whether the remote computer system includes at least one device capable of meeting the requirements of the application;
if at least one device with one or more hardware components capable of meeting the requirements of the application exists:
communicate the application to the remote computer system by downloading the application to the at least one device;
trigger the remote computer system to execute the application on the at least one device; and
receive, from the remote computer system, data processed by the application.

8. The computing environment according to claim 7, wherein the one or more devices correspond to one or more sensors and actuators, wherein the application receives raw data from the one or more sensors and generates processed data from the raw data and communicates controls to the one or more actuators based on the raw data received from the one or more sensors.

9. The computing environment according to claim 7, wherein the component characteristics of the one or more hardware components include a data type generated by the one or more hardware components and one or more capabilities of the one or more devices, and wherein the requirements of the one or more applications include data and hardware capabilities that facilitate proper execution of the one or more applications and one or more other different applications required by the one or more applications.

10. The computing environment according to claim 7, wherein the instruction code of the enterprise data center causes the enterprise data center processor to:
communicate a plurality of applications to the remote computer for concurrent execution,
wherein the remote computer is configured to:
determine a priority associated with processed data generated by each application; and
select processed data for communication to the enterprise data center based on an associated priority.

11. The computing environment according to claim 10, wherein the remote computer includes a data storage device to store processed data generated by the plurality of applications until the processed data can be communicated to the enterprise data center.

12. The computing environment according to claim 7, wherein the instruction code of the enterprise data center causes the enterprise data center processor to:
communicate a control plane message to the remote computer that specifies the application,
wherein the edge device is configured to:
communicate authentication credentials to an authentication service of the enterprise data center;
if the authentication service authenticates the computer, communicate a request to download the application from an application repository of the enterprise data center that stores a plurality of applications;
receive the requested application from the application repository.

13. A non-transitory computer readable medium that stores instruction code for provisioning a computer, wherein the instruction code is executable by a machine for causing the machine to perform acts comprising:
retrieving, from a storage device within the machine, a metadata graph that defines a graph structure of nodes, edges and properties that represent relationships between one or more hardware components of a remote computer system and component characteristics of the one or more hardware components, and relationships between one or more applications and requirements of the one or more applications;
receiving, from the remote computer system, information associated with one or more devices that are added to the remote computer system;
inserting into the metadata graph one or more nodes to represent the one or more devices;
receiving information that defines data types and attributes associated with the one or more devices;
associating in the metadata graph the one or more nodes that represent the one or more devices with the corresponding data types and attributes; receiving a selection of an application;
determining, via the metadata graph, whether the remote computer system includes at least one device capable of meeting the requirements of the application;
if at least one device with one or more hardware components capable of meeting the requirements of the application exists;
if the at least one computer exists:
communicating the application to the remote computer system by downloading the application to the at least one device;
triggering the remote computer system to execute the application on the at least one device; and
wherein after being triggered, the computer communicates data processed by the application to an external system external from the remote computer system via a network that facilitates communications between the external system and the remote computer system.

14. The non-transitory computer readable medium according to claim 13, wherein one or more devices correspond to one or more sensors, wherein the application receives raw data from the one or more sensors and generates processed data from the raw data.

15. The non-transitory computer readable medium according to claim 13, wherein the component characteristics of the one or more hardware components include a data type generated by the one or more hardware components and one or more capabilities of the one or more devices, and wherein the requirements of the one or more applications include data and hardware capabilities that facilitate proper execution of the one or more applications.

16. The non-transitory computer readable medium according to claim 13, wherein the instruction code is further executable to cause the machine to perform acts comprising:
communicating a plurality of applications to the remote computer system for concurrent execution;
wherein in response, the remote computer system determines a priority associated with processed data generated by each application; and
selects processed data for communication to the external system based on an associated priority.

17. The non-transitory computer readable medium according to claim 16, wherein the remote computer system includes a data storage device to store processed data generated by the plurality of applications until the processed data can be communicated to the machine.

18. The non-transitory computer readable medium according to claim 13, wherein the instruction code is further executable to cause the machine to perform acts comprising:
communicating a control plane message to the remote computer system that specifies the application;
wherein in response, the remote computer system communicates authentication credentials to an authentication service;
if the authentication service authenticates the remote computer system, communicating the application from an application repository that stores a plurality of applications to the remote computer remote.

* * * * *